United States Patent Office 3,394,169
Patented July 23, 1968

3,394,169
3,7,7-TRIALKYL-5-HEPTENOL AND ITS PREPARATION
Herman E. Davis, Kingsport, Tenn., assignor to Eastman Kodak Company, Rochester, N.Y., a corporation of New Jersey
No Drawing. Filed May 10, 1965, Ser. No. 454,698
9 Claims. (Cl. 260—488)

ABSTRACT OF THE DISCLOSURE

Novel compositions of matter which are 3,7,7-trialkyl-5-heptenols of the formula

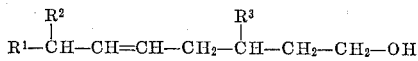

in which each of $R^1$, $R^2$ and $R^3$ is lower alkyl, and esters of such alcohols. The invention also includes specific processes for the preparation of analogous pyran derivatives. These alcohols, esters and pyran derivatives are useful as intermediates in the manufacture of perfumes.

---

This invention relates to a novel chemical process and, more particularly, to a novel process for the preparation of certain novel 3,7,7-trialkyl-5-heptenols. The invention also relates to novel intermediates which are useful in the process of the invention and includes the manufacture of certain valuable by-products which are also obtained in practicing the process of the invention.

In accordance with the process of the invention for preparing a 3,7,7-trialkyl-5-heptenol, a 3,7,7-trialkyl-5-oxoheptanal is reduced. The reduction of the 3,7,7-trialkyl-5-oxoheptanal can be carried out by hydrogenation in the presence of a solid hydrogenation catalyst or chemically with a reducing agent, e.g., an alkali metal borohydride such as sodium borohydride, an alkoxyborohydride, an alkali metal hydride, etc. The reduction is preferably carried out catalytically as explained more fully hereinafter. The reaction product from the catalytic reduction of the 3,7,7-trialkyl-5-oxoheptanal contains either a 2[2,2-dialkylethyl]-4-alkyltetrahydropyran or a 3,7,7-trialkyl-51hydroxyheptanol or a mixture thereof. The 3,7,7-trialkyl-5-hydroxyheptanol is then esterified to form a diester of 3,7,7-trialkyl-5-hydroxyheptanol and the diester is subjected to pyrolysis under carefully controlled conditions to form a 3,7,7-trialkyl-4-heptenol ester and a 3,7,7-trialkyl-5-heptenol ester. The 3,7,7-trialkyl-5-heptenol ester is then saponified to form a novel 3,7,7-trialkyl-5-heptenol. Alternatively, the mixture of 3,7,7-trialkyl-4-heptenol ester and 3,7,7-trialkyl-5-heptenol ester can be saponified to form a mixture of 3,7,7-trialkyl-4-heptenol and 3,7,7-trialkyl-5-heptenol.

The 2[2,2-dialkylethyl]-4-alkyltetrahydropyran which is formed as a by-product in the process of the invention is a valuable compound. I have discovered these compounds can be produced by catalytically reducing the 3,7,7-trialkyl-5-oxoheptanal in the presence of a solid hydrogenation catalyst containing nickel or ruthenium.

I have discovered that maximum amounts of the 3,7,7-trialkyl-5-hydroxyheptanol can be achieved if the 3,7,7-trialkyl-5-oxoheptanal is catalytically reduced in the presence of a solid hydrogenation catalyst containing copper.

The unusual selectivitiy of the hydrogenation reaction for the 2[2,2-dialkylethyl]-4-alkyltetrahydropyran or for the 3,7,7-trialkyl-5-hydroxyheptanol is completely unexpected. Thus, when a nickel catalyst or a ruthenium on carbon catalyst is employed in the hydrogenation of the 3,7,7-trialkyl-5-oxoheptanal, the 2[2,2 - dialkylethyl] - 4-alkyltetrahydropyran is obtained almost to the exclusion of other products whereas, when a copper catalyst is employed, the 3,7,7-trialkyl-5-hydroxyheptanol is obtained almost to the exclusion of other products. Other ruthenium catalysts, e.g., ruthenium or alumina, give a mixture of the two products.

I have also discovered that the 3,7,7-trialkyl-5-hydroxyheptanol can be converted to the 2[2,2-dialkylethyl]-4-alkyltetrahydropyran by contacting the 3,7,7-trialkyl - 5 - hydroxyheptanol with an acid cyclodehydration catalyst. The acid cyclodehydration catalyst which effects the cyclodehydration of the 3,7,7 - trialkyl - 5 - hydroxyheptanol can be any of the acidic catalyst which have been employed in esterification reactions. Useful acid cyclodehydration catalysts include mineral acids such as sulfuric acid, phosphoric acid, hydrochloric acid, nitric acid, etc., and aromatic sulfonic acids such as p-toluene sulfonic acid. Preferred as cyclodehydration catalysts are the aromatic sulfonic acids.

The cyclodehydration reaction, shown in Equation 5 of Table I below, is carried out by contacting the 3,7,7-trialkyl-5-hydroxyheptanol with the acid cyclodehydration catalyst. The contacting is preferably carried out at elevated temperature, e.g., about 50° C. to about 200° C. A preferred method for carrying out the contacting of the acid cyclodehydration catalyst and the 3,7,7-trialkyl-5-hydroxyheptanol is to heat a mixture containing the catalyst, the 3,7,7-trialkyl-5-hydroxyheptanol, and an organic solvent which forms an azeotrope with water having a boiling point between about 50° C. and about 200° C. at its boiling point. An example of such an organic solvent is toluene. The water-toluene azeotrope has a boiling point of about 84° C.

The process of my invention can be represented by the equations in Table I below:

TABLE I

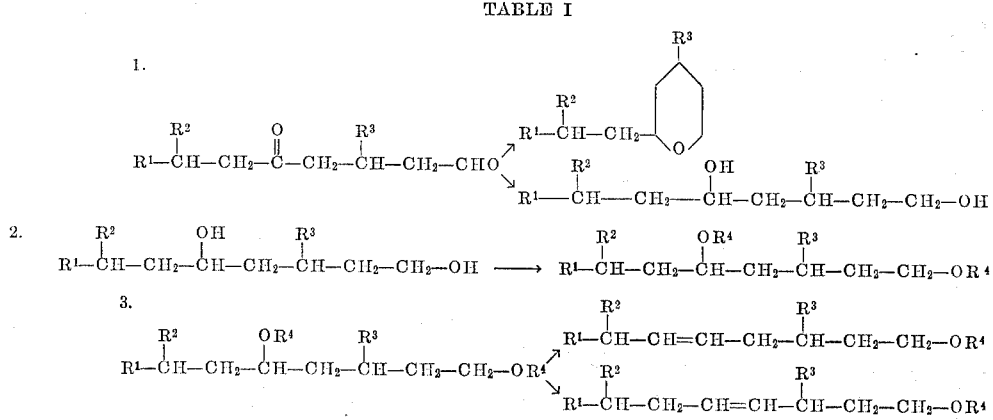

TABLE 1—Continued

4.
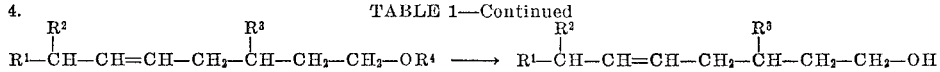

5.
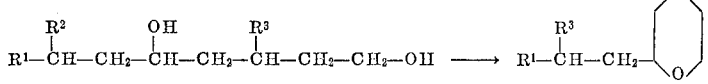

In the preceding formulae in the equations in Table I for the process of the invention, each of the substituents $R^1$, $R^2$, and $R^3$ is alkyl, preferably lower alkyl; and the substituent $R^4$ is acyl, preferably alkanoyl. The substituents $R^1$, $R^2$, and $R^3$ are typical methyl, ethyl, propyl, isopropyl, butyl, sec-butyl, isobutyl, tert-butyl, etc. The substituent $R^4$ is typically acetyl, propionyl, butyryl, isobutyryl, etc. Methyl is especially preferred as the alkyl substituent represented by $R^1$, $R^2$, and $R^3$ and acetyl is especially preferred as the acyl substituent represented by $R^4$.

Examples of some of the 3,7,7-trialkyl-5-oxoheptanals which are useful in the process of the invention are compounds such as 3,7-dimethyl-5-oxooctanal; 3,7-diethyl-5-oxononanal; 3,7-dipropyl-5-oxodecanal; 3,7-dibutyl-5-oxoundecanal; 3,7-dipropyl-5-oxoundecanal; 3-methyl-7-propyl-5-oxodecanal; 3-methyl-7-ethyl-5-oxodecanal; etc.

Among the 2[2,2-dialkylethyl]-4-alkyltetrahydropyrans which can be prepared by the process of my invention are compounds such as 2-isobutyl-4-methyltetrahydropyran; 2[2-methylbutyl]-4-ethyltetrahydropyran; 2-[2-ethylhexyl]-4-isobutyltetrahydropyran; 2[2-butylhexyl]-4-propyltetrahydropyran; etc.

The novel 3,7,7-trialkyl-5-hydroxyheptanols of the invention are exemplified by compounds such as 3,7-dimethyl-5-hydroxyoctanol; 3,7-dipropyl-5-hydroxydecanol; 3,7-diethyl-5-hydroxynonanol; 3,7-dibutyl-5-hydroxyundecanol; 3-methyl-7-propyl-5-hydroxydecanol; 3-methyl-7-ethyl-5-hydroxydecanol; etc. The novel diesters of the invention include diesters of the preceding 3,7,7-trialkyl-5-hydroxyheptanols with acids such as acetic acid, propionic acid, butyric acid, isobutyric acid, etc. Included among the novel 3,7,7-trialkyl-5-heptenols and 3,7,7-trialkyl-5-heptenol esters of the invention are alcohols such as 3,7-dimethyl-5-octenol; 3,7-dipropyl-5-decenol; 3,7-diethyl-5-nonenol; 3,7-dibutyl-5-undecenol; 3,7-dipropyl-5-undecenol; 3-methyl-7-propyl-5-decenol; 3-methyl-7-ethyl-5-decenol; etc., and esters thereof with acids such as acetic acid, propionic acid, butyric acid, isobutyric acid, etc.

The 3,7,7-trialkyl-5-oxoheptanals which are employed as the starting materials in the process of the invention can be prepared by contacting a 1,5,5-trialkyl-1-penten-3-one, e.g., 6-methyl-2-hepten-4-one, with an alkyl vinyl ether, e.g., ethyl vinyl ether, and then contacting the reaction product with a dilute aqueous solution of an acid, e.g., phosporic acid. The preparation of 3,7,7-trialkyl-5-oxoheptanals by this procedure is described more fully in the copending application of Brannock and Davis, Ser. No. 381,558, filed July 9, 1964 now U.S. Patent No. 3,287,272.

The preferred 3,7,7-trialkyl-5-oxoheptanal for use in the process of the invention is 3,7-dimethyl-5-oxooctanal.

The reduction of the 3,7,7-trialkyl-5-oxoheptanal, shown in Equation 1 of Table I, is preferably carried out by contacting the 3,7,7-trialkyl-5-oxoheptanal with hydrogen at a temperature of about 75° C. to about 200° C. and a pressure of about 500 to about 5,000 p.s.i. in the presence of a solid hydrogenation catalyst. As indicated hereinbefore, the preferred hydrogenation catalysts when a 2[2,2-dialkylethyl]-4-alkyltetrahydropyran is desired are ruthenium on carbon catalysts or nickel containing catalysts. These catalysts can be supported or unsupported. Thus, Raney nickel, nickel or ruthenium supported on carbon, nickel on alumina, etc., are examples of such preferred catalysts. One such preferred nickel catalyst is nickel catalyst G49A, available from the Girdler Co., Louisville, Ky.

When it is desired to maximize the yield of the 3,7,7-trialkyl-5-hydroxyheptanol, the preferred catalysts are those containing copper. The preferred copper-containing catalysts for use in the process of the invention are those which also contain chromium. Examples of some preferred copper and copper-chromium solid catalysts which are available commercially include those available from the Harshaw Chemical Co., Cleveland, Ohio, under the designation Cu 2501-G4-10 and Cu 1407. An especially preferred copper-chromium catalyst is Copper Chromite Catalyst 1106P of Harshaw Chemical Co. This catalyst contains 39 percent cupric oxide, 43 percent chromic trioxide, 10 percent barium oxide, and 8 percent inert binder.

When the process of the invention is operated to produce a 2[2,2-dialkylethyl]-4-alkyltetrahydropyran, the reaction is preferably carried out at a temperature of about 75° C. to 200° C. and a pressure of from about 500 to about 5,000 p.s.i. Especially preferred reaction conditions when operating the process of the invention to produce a maximum amount of 2[2,2-dialkylethyl]-4-alkyltetrahydropyran include a temperature of from about 100° C. to about 150° C. and a pressure of from about 1,500 to about 2,500 p.s.i. When using a copper-containing catalyst to produce a maximum amount of a 3,7,7-trialkyl-5-hydroxyheptanol, the process of the invention is preferably carried out at a temperature of from about 100° C. to about 200° C. and a pressure of from about 1,000 to about 5,000 p.s.i. Especially preferred operating conditions for producing a maximum amount of 3,7,7-trialkyl-5-hydroxyheptanol include a temperature of from about 125° C. to about 175° C. and a pressure of from about 2,000 to about 3,000 p.s.i.

The 3,7,7-trialkyl-5-hydroxyheptanol diesters which are pyrolyzed in the process of the invention can be prepared as shown in Equation 2 of Table I by conventional means by reacting an organic carboxylic acid or an organic carboxylic acid anhydride with a 3,7,7-trialkyl-5-hydroxyheptanol. The preferred diesters for use in the process of the invention are diesters formed from a 3,7,7-trialkyl-5-hydroxyheptanol and a lower alkanoic acid such as acetic acid, propionic acid, butyric acid, etc.

The pyrolysis of the 3,7,7-trialkyl-5-hydroxyheptanol diester in accordance with Equation 3 of Table I must be carried out under carefully controlled conditions. Thus the reaction temperature must be maintained between about 350° C. and about 425° C. The reaction temperature is preferably controlled between about 360° C. and 390° C. The pyrolysis of the 3,7,7-trialkyl-5-hydroxyheptanol diester can be carried out by passing the diester through a reaction zone which is maintained at the desired temperature. The reaction zone can contain inert packing to aid in maintaining the desired temperature throughout the reaction zone. In some instances it is preferred to dilute the diester with an inert volatile solvent before the diester is passed through the reaction zone. Benzene is a suitable organic solvent for use as such a diluent.

The effluent from the reaction zone contains a 3,7,7-trialkyl-4-heptanol ester and a 3,7,7,-trialkyl-5-heptanol ester. The alcohols, i.e., 3,7,7,-trialkyl-4-heptanol and 3,7,7,-trialkyl-5-heptanol, are obtained by saponifying the esters which are produced in the pyrolysis reaction as shown in Equation 4 of Table I. The saponification of the 3,7,7-trialkyl-4-heptanol ester and the 3,7,7-trialkyl-5-heptanol ester can be carried out by conventional means. Thus the mixture of esters can be saponified by warming them in the presence of water with a small amount of sodium hydroxide or other alkali metal hydroxide.

The following examples illustrate the preparation of a 3,7,7-trialkyl-5-heptanol in accordance with the process of my invention.

EXAMPLE 1

Ethanol (70 ml.), 3,7-dimethyl-5-oxooctanal (70 g., 0.41 mole) and a copper chromite catalyst (Harshaw 1106–P) were heated in an autoclave at 150° C. and 2,500 p.s.i. hydrogen pressure until no further hydrogen was absorbed. The catalyst was removed and the 3,7-dimethyl-1,5-octanediol (53 g.) distilled. B.P. 124–125° C./1.5 mm., $n_D^{20}$ 1.4558.

*Analysis.*—Calcd.: C, 69.0%; H, 12.7%. Found: C, 69.02%; H, 12.77%.

EXAMPLE 2

The diacetate of the 3,7-dimethyl-1,5-octanediol (34 g, 0.13 mole) of Example 1 was diluted with an equal volume of benzene and passed through a Vycor tube 1 in. x 12 in. packed with Vycor chips and heated to 370° C. with an electric furnace. The addition rate was approximately 1 ml./min. The effluent, by gas chromatography, was a mixture of acetic acid, benzene, 3,7-dimethyl-4-octenyl acetate and 3,7-dimethyl-5-octenyl acetate. The 3,7-dimethyl-4-octenyl acetate and the 3,7-dimethyl-5-octenyl acetate were distilled at 58° C./0.5 mm. Weight 17 g., $n_D^{20}$ 1.4368. NMR and infrared data agreed with the proposed structure. By gas chromatography the product was approximately a 50–50 mixture of the 3,7-dimethyl-4-octenyl acetate and 3,7-dimethyl-5-octenyl acetate. On saponification a mixture of the corresponding unsaturated alcohols was obtained. B.P. 77.78° C./2 mm., $n_D^{20}$ 1.4479. These alcohols have an odor very similar to that of citronellol, an important article of commerce The following examples illustrate the preparation of a 2[2,2-dialkyethyl]-4-alkyltetrahydropyran according to the process of the invention.

EXAMPLE 3

Ethanol (70 ml.), 3,7-dimethyl-5-oxooctanal (70 g., 0.41 mole) and 7 g. of a supported nickel catalyst (Girdler G49A) were heated in an autoclave at 125° C. and 2,000 p.s.i. hydrogen pressure until no further hydrogen was absorbed. The catalyst was removed and the product distilled collecting the fraction (43 g.) boiling at 75–76° C./19 mm., $n_D^{20}$ 1.4323.

*Analysis.*—Calcd.—C, 76.95%; H, 12.92%. Found: C, 77.05%; H, 12.97%.

By gas chromatography the product was a mixture of the cis (90–95%) and trans (5–10%) isomers of the 2-isobutyl-4-methyltetrahydropyran.

EXAMPLE 4

Example 3 was repeated except that ruthenium on alumina was used as a catalyst. The product was a mixture of 2-isobutyl-4-methyltetrahydropyran and 3,7-dimethyl-1,5-octanediol in a ratio of about 1 to 2. Infrared and other data indicated the compounds were identical to the compounds of Examples 3 and 1, respectively.

EXAMPLE 5

Toluene (100 ml.), 3,7-dimethyl-1,5-octanediol (17.4 g., 0.1 mole) and p-toluene sulfonic acid (0.05 g.) were refluxed under a Dean-Stark trap until 1.8 ml. of water had been removed. The solution was washed with water until neutral and the toluene was removed by distillation. The 2-isobutyl-4-methyltetrahydropyran (10 g.) was distilled at 41° C./1 mm., $n_D^{20}$ 1.4350. Infrared data was in agreement with that of Example 3. By gas chromatography the two samples were identical except that this sample contained more of the trans isomer than that of Example 1.

The products and by-products of the process of the invention are useful in the perfume industry. Thus 2-isobutyl-4-methyltetrahydropyran, a prefered 2[2,2-dialkylethyl]-4-alkyltetrahydropyran, which is produced as a by-product in the hydrogenatio nof 3,7-dimethyl-5-oxooctanal, is commonly called dihydro rose oxide and is disclosed in Bull. Soc. Chim., France, 1961, 645–57. This compound, which has a pleasant odor, is useful in the formulation of perfumes or in perfumed soaps and toilet articles. The compound 3,7-dimethyl-5-octen-1-ol, a preferred 3,7,7-trialkyl-5-heptenol, produced in the process of our invention, has a pleasant odor somewhat similar to citronellol and is useful in the perfume and flavoring industries as a substitute for citronellol.

Although the invention has been described in considerable detail with particular reference to certain preferred embodiments thereof, variations and modifications can be effected within the spirit and scope of the invention as described hereinbefore and as defined in the appended claims.

I claim:

1. An ester of the formula:

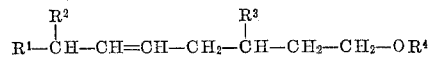

in which each of $R^1$, $R^2$ and $R^3$ is lower alkyl and $R^4$ is lower alkanoyl.

2. A lower alkanoic acid ester of 3,7-dimethyl-5-octenol.

3. 3,7-dimethyl-5-octenyl acetate.

4. An alcohol of the formula:

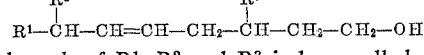

in which each of $R^1$, $R^2$ and $R^3$ is lower alkyl.

5. 3,7-dimethyl-5-octenol.

6. A compound of the formula:

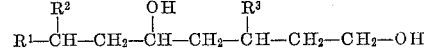

in which each of $R^1$, $R^2$ and $R^3$ is lower alkyl.

7. A compound of the formula:

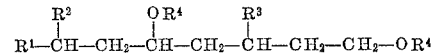

in which each of $R^1$, $R^2$, and $R^3$ is lower alkyl and $R^4$ is lower alkanoyl.

8. 3,7-dimethyl-5-hydroxyoctanol.

9. A lower alkanoic acid diester of 3,7-dimethyl-5-hydroxyoctanol.

References Cited

UNITED STATES PATENTS

| | | | |
|---|---|---|---|
| 2,768,978 | 10/1956 | Robertson | 260—345.1 XR |
| 2,843,607 | 7/1958 | Servigne et al. | 260—494 XR |
| 3,004,311 | 9/1962 | Milligan | 260—345.1 XR |
| 3,052,730 | 9/1962 | Eschinazi | 260—638 XR |
| 3,077,495 | 2/1963 | Levine | 260—494 XR |
| 3,147,267 | 9/1964 | Rogers | 260—345.1 XR |
| 3,166,575 | 1/1965 | Naves | 260—345.1 |

HENRY R. JILES, *Primary Examiner.*

J. M. FORD, *Assistant Examiner.*